United States Patent
Tabirian

(10) Patent No.: US 6,526,077 B1
(45) Date of Patent: Feb. 25, 2003

(54) LINE-SCAN LASER BEAM PROFILER

(76) Inventor: Nelson Tabirian, 250 Seneca Trail, Maitland, FL (US) 32751

( * ) Notice: Subject to any disclaimer, the term of this patent is extended or adjusted under 35 U.S.C. 154(b) by 0 days.

(21) Appl. No.: 09/578,182

(22) Filed: May 25, 2000

(51) Int. Cl.$^7$ .............................. H01S 3/13
(52) U.S. Cl. ..................... 372/29.012; 372/29.08; 356/21
(58) Field of Search ................. 235/92; 250/214 AG; 356/218, 345, 121, 21; 372/29.012

(56) References Cited

U.S. PATENT DOCUMENTS

| | | | | |
|---|---|---|---|---|
| 3,651,262 A | * | 3/1972 | Korpel | 360/110 |
| 3,721,809 A | * | 3/1973 | Strandberg et al. | 242/534 |
| 4,035,088 A | * | 7/1977 | Jenkins et al. | 356/218 |
| 4,160,598 A | * | 7/1979 | Firester et al. | 356/121 |
| 4,260,255 A | | 4/1981 | Wachs et al. | |
| 4,297,587 A | * | 10/1981 | Baker | 250/214 AG |
| 5,100,231 A | | 3/1992 | Sasnett et al. | |
| 5,323,267 A | | 6/1994 | Galarneau et al. | |
| 5,329,350 A | * | 7/1994 | Wright et al. | 356/218 |
| 5,621,525 A | * | 4/1997 | Vogeler et al. | 356/345 |
| 5,694,209 A | * | 12/1997 | Alfille et al. | 250/227.31 |

* cited by examiner

Primary Examiner—Paul Ip
Assistant Examiner—Hung Vy

(57) ABSTRACT

Power density profile of a laser beam is characterized by scanning a thin thread across the beam and registering the intensity of radiation scattered from the thread. The diameter of the beam along the scan direction is determined by measuring the width of the signal received from the scattered power for the given speed of the thread across the beam.

5 Claims, 6 Drawing Sheets

LINE-SCAN LASER BEAM PROFILER

CROSS-REFERENCE TO RELATED APPLICATIONS

U.S. PATENT DOCUMENTS

| | | | |
|---|---|---|---|
| 4,260,255 | 4/1981 | Wachs et al. | |
| 4,035,088 | 7/1977 | Jenkins et al. | 356/218 |
| 5,621,525 | 4/1997 | Tabirian et al. | 356/345 |
| 5,100,231 | 3/1992 | Sasnett et al | |
| 4,160,598 | 7/1979 | Firester et al. | |
| 5,323,267 | 6/1994 | Galarneau et al. | |

STATEMENT REGARDING FEDERALLY SPONSORED RESEARCH OR DEVELOPMENT

Not Applicable

BACKGROUND OF THE INVENTION

Power and power density are among the most important characteristics of laser beams to be measured and controlled for essentially all laser applications. Present technologies provide a number of solutions, however, they are not suitable for high power laser beams. Citing U.S. Pat. No. 4,035,088 to A. H. Jenkins and J. J. Wachs, which is incorporated by reference, "... the highly intense laser beam oversaturated and destroyed known energy detectors and power meters with the exception of large heat sink spherical calorimeter, which totally blocked the beam." Blocking the beam does not allow in-line monitoring of the beam and, due to large temperature increase, has other disadvantages too such as the impossibility of measuring relatively fast variations in the beam power during operation of the laser.

A laser beam sampling technique that overcomes some of these problems for power measurement is described in the U.S. Pat. Nos. 4,260,255 and 4,035,088 to Wachs and Jenkins. In these inventions, an apparatus for sampling and measuring power of a high energy laser beam without blocking or unduly perturbing the beam is realized with the aid of highly reflective ribs having knife edges that are making an angle with respect to the propagation direction of the beam to reflect part of it out of the main beam for energy measurement.

Even more difficult is characterization of the profile of high power laser beams and measuring its radius which would allow determination of the power density of radiation. There were many attempts of overcoming the problems outlined above. One approach relies on registering the changes in the spatial profile of the beam propagated through a transparent nonlinear optical material. Such an apparatus for power density measurement of electromagnetic radiation is suggested in U.S. Pat. No. 5,621,525 to Tabirian et al. which is incorporated by reference. For high power industrial or defense laser beams, even residual absorption in the nonlinear optical material may, however, lead to saturation and destruction of the nonlinear optical element constituting the sensor head of the laser beam measurement device.

Many present-day devices for laser beam profile measurements use knife-edges, blades and slits for scanning across the beam. The transmission of the beam past the knife-edge (or any other aperture) is then monitored for characterization of the power density distribution across the beam. Several patents, such as U.S. Pat. No. 5,100,231 to Sasnett et al, U.S. Pat. No. 4,160,598 to Firester et al, describing such approaches are incorporated by references. The disadvantage of laser beam profiling devices that are using knife-edges, slits, pinholes, and other apertures is that they are blocking the beam. Consequently, in-line profiling of the laser beam is not possible, and the high-energy laser beams can damage the apertures.

Though it is principally possible to sample a small portion of a high power laser beam and then measure it with imaging CCD, such technique is also not satisfactory due to the absence of sufficiently high damage threshold, large area and inexpensive sampling materials. As an example, a diffractive sampling element is described in U.S. Pat. No. 5,323,267 to Galarneau et al. The diffractive optical element is made of optical materials such as glass or crystals. These materials are still rather vulnerable to high power laser radiation. Internal or laser-induced inhomogeneities in such materials distort the beam. Their size is technologically limited to 1–2 inches in diameter. Moreover, the optical materials that shall be used for infrared radiation (such as Zinc Selenide and Calcium Fluoride) are expensive.

Thus, present devices for measurement of laser beam diameter and characterizing of its profile are not satisfactory for high power laser beams; they are based on hypersensitive imaging techniques (CCD), use expensive optical materials vulnerable to radiation, are based on optical components with strict tolerances on their homogeneity and thickness, and can not be carried out without blocking the beam.

BRIEF SUMMARY OF THE INVENTION

The first objective of the present invention is to provide a technique for non-obstructive in-line measurement of the diameter of laser beams, particularly, those of high power infrared beams.

The second objective of this invention is to provide means for in-line determination of a laser beam quality, particularly for high power and infrared beams.

The third objective of this invention is to provide means for in-line characterization of spatial profile of laser beams.

The fourth objective of this invention is to provide means for non-obstructive in-line characterization of energy parameters of laser beams.

The invention includes driving a thin metallic wire, or a thread made of other material, across the beam and registering the portion of the beam scattered from the thread with the aid of a detector which, in general, may include a lens that is collecting said scattered light. The speed of scan of the wire across the beam is set by the given driving technique or it is independently measured by using a reference wire at a pre-established fixed distance from the first one. The time delay between the signals received from both of the wires allows independent determination of the speed of scan of wires across the beam which is used then for calculating the spatial width of the beam from the measured temporal width of the signal of radiation scattered from the wires.

Further objects and advantages of this invention will be apparent from the following detailed description of presently preferred embodiment, which is illustrated schematically in the accompanying drawings.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1:
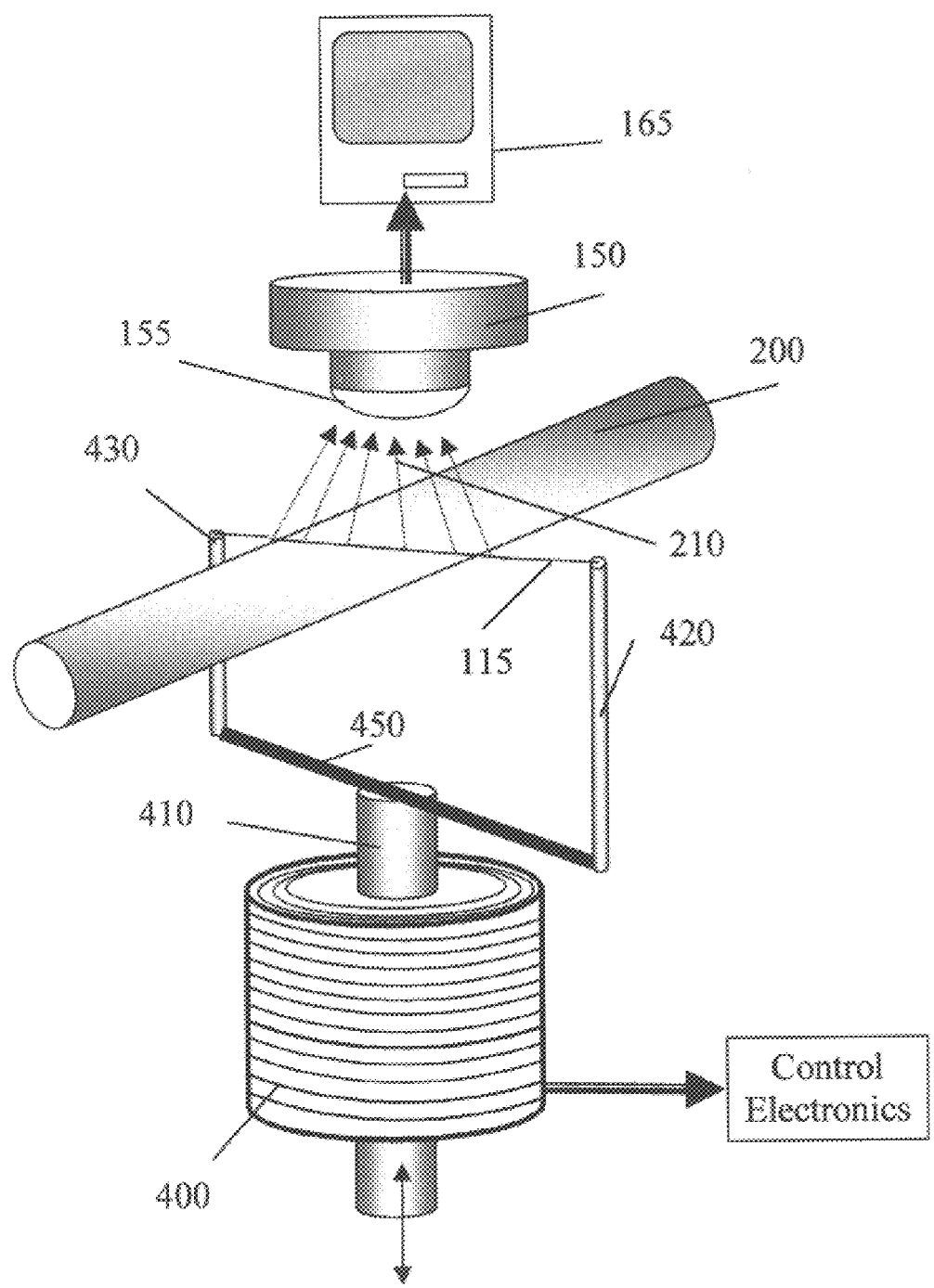
FIG. 1 shows an embodiment of the line-scan apparatus for laser beam diameter determination where a solenoid is used for creation of an oscillatory motion.

The present line-scan laser beam profiler consists in three essential components: a thin thread (such as metallic wire or a glass fiber), a mechanism for moving the thread across the beam with a given speed, a photodetector for registering the scattered, reflected or diffracted light, and a data processing and display means for calculating and outputting the information about the beam diameter from the measured intensity of the scattered light as a function of the thread positions in the beam. These processes can be realized in many ways. Referring to the drawing of the preferred embodiment shown in FIG. 1, a laser beam diameter measuring apparatus consists of a thin thread made of a metallic wire 115 mounted to a frame having two poles 420 and 430 which are fixed parallel to each other on a base 450 the latter being attached to a metallic core 410 of a solenoid 400. The core 410 is pulled in and out from the solenoid when an electric voltage is applied to the solenoid. Thus a motion is generated to scan the wire across the laser beam 200. When the wire 115 enters the beam 200, the light is scattered from the wire. The light scattered from the wire is then registered with the aid of the photodetector 150 that may or may not have a collecting lens 155, and is positioned outside of the laser beam. The signal from the photodetector is then processed and displayed with the use of a data acquisition, processing and display system such as a computer 165.

Figure 2A:
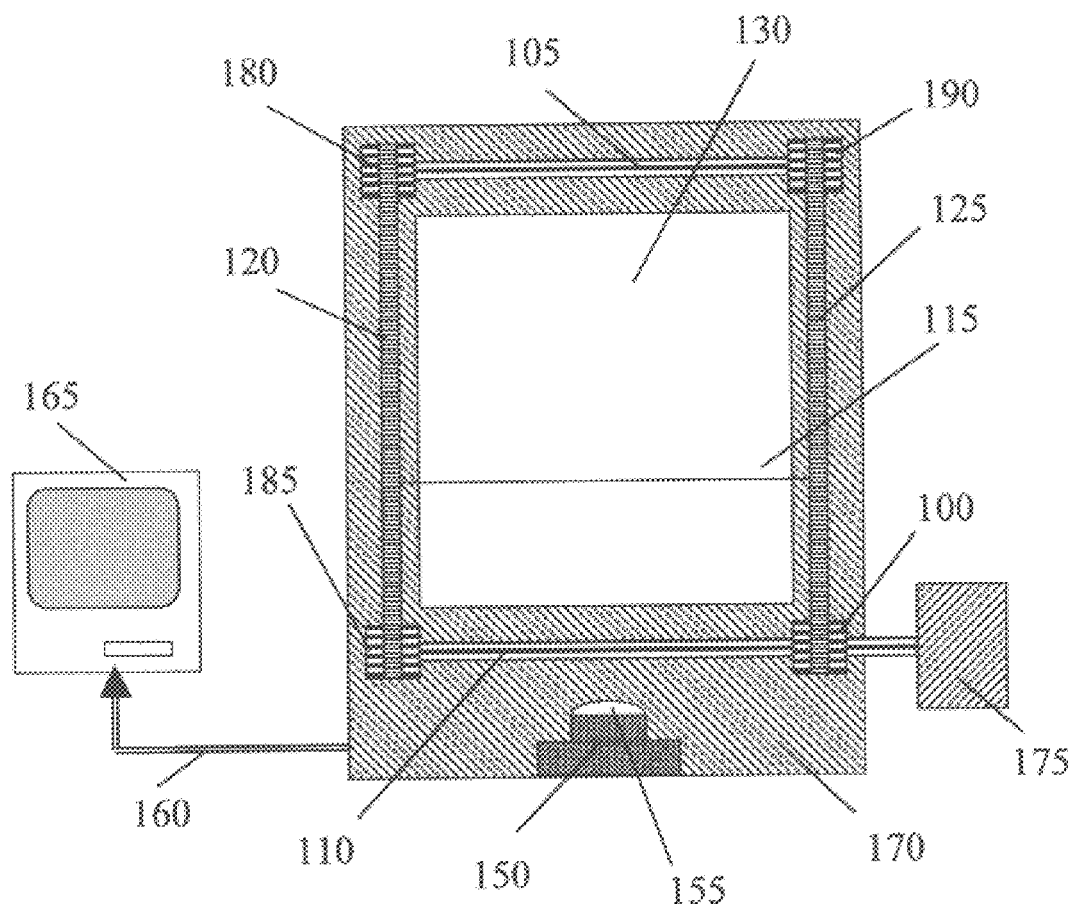
FIG. 2A shows an exemplary design of the wire-scan laser beam profiler.
Figure 2B:
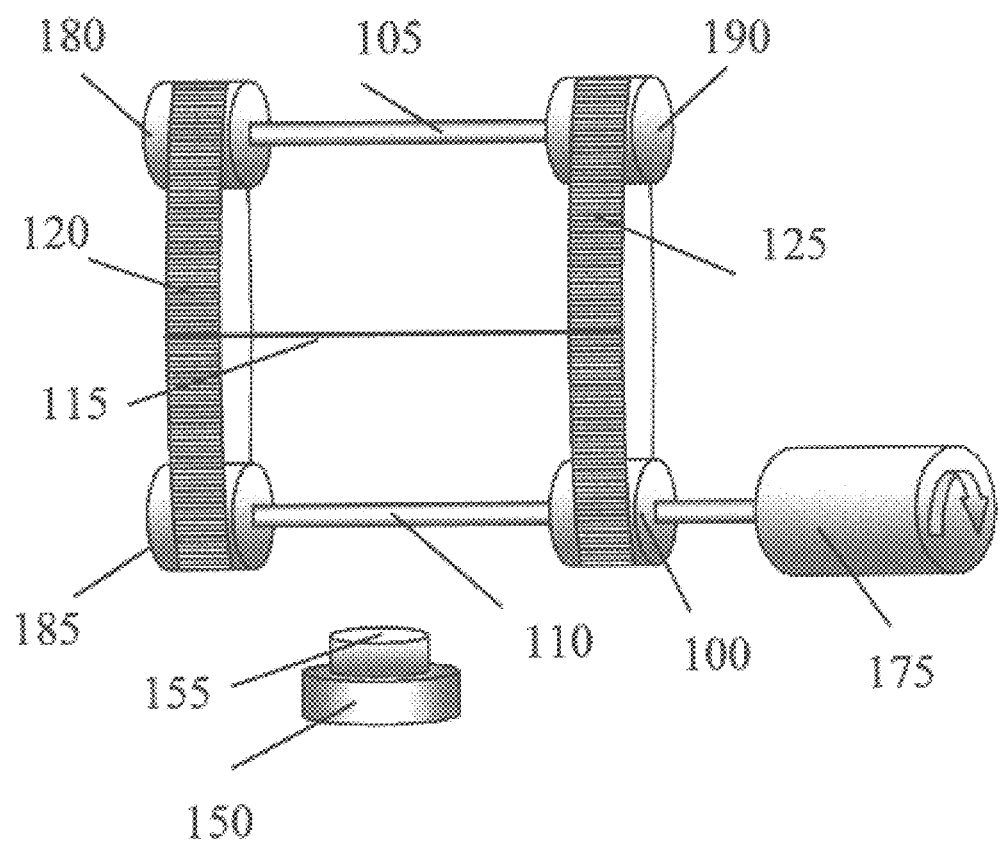
FIG. 2B is a three dimensional view of the line-scan laser beam profiler head shown in FIG. 2A.
Figure 2C:
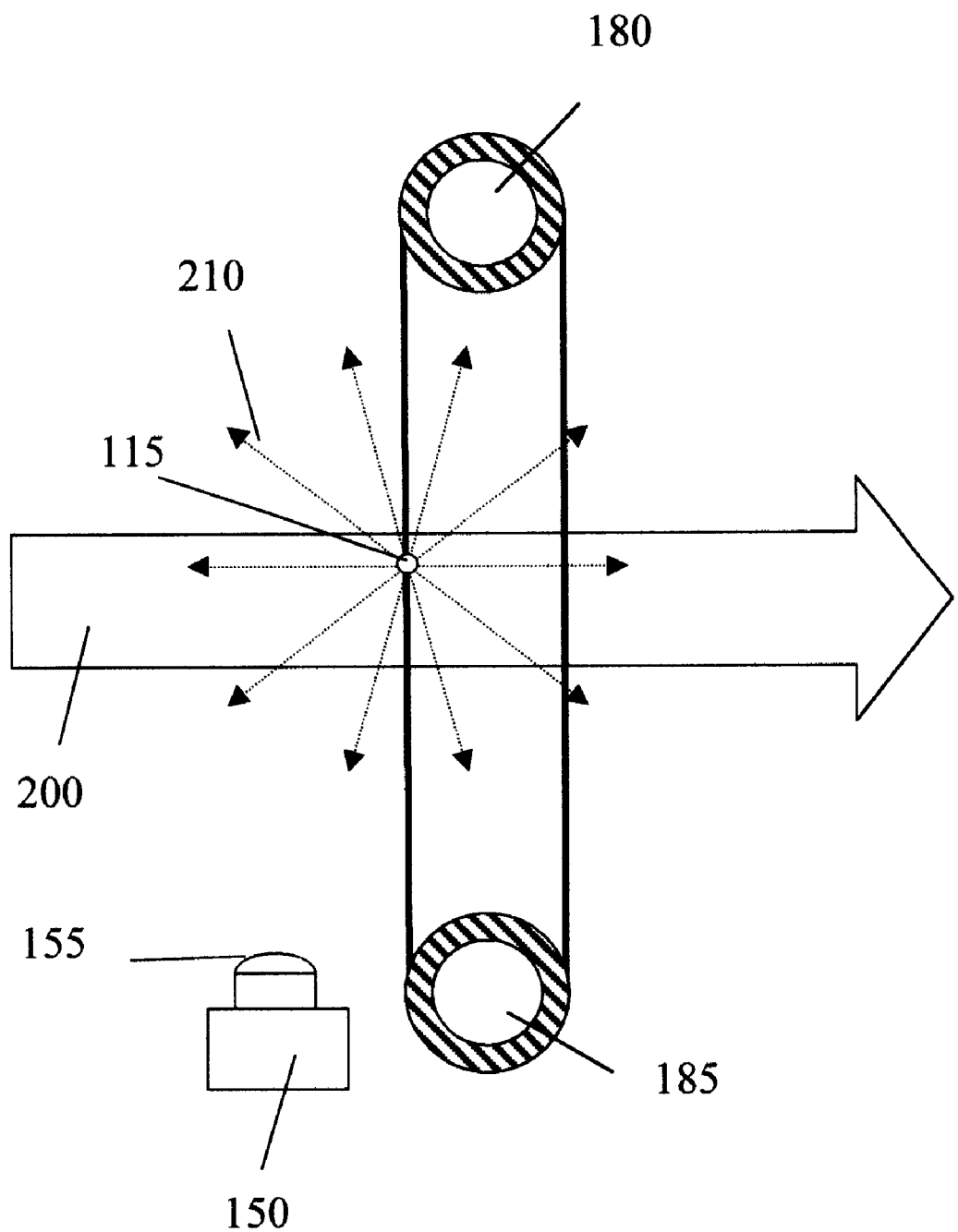
FIG. 2C is a side view of the line-scan laser beam profiler head shown in FIG. 2A.

In the embodiment 170 shown in FIG. 2A, each end of the wire 115 is attached to a belt 120 and 125 that are brought into rotation with the aid of pulleys 100, 180, 185 and 190. Each pair of these pulleys is mounted in a common axis: the pulleys 180 and 190 have the axis 105, and pulleys 100 and 185 have the axis 110. The axes of the pulleys 100 and 185 are brought into rotation with the aid of the motor 175. The photodetector 150 with collecting lens 155 is mounted at one side of the thread to receive the scattered light and output the signal to the data processing and display system 165 with electronic connectors 160. A three dimensional view of the mechanism of this embodiment is shown in FIG. 2B while FIG. 2C shows the projection of this mechanism, the light beam 200 and the scattered radiation 210.

The intensity of the signal received by the photodetector 150 is proportional to the intensity of the scattered light 210 integrated along the wire 115. If one aligns the x-axis of a Cartesian coordinate system along the wire, and the y-axis along the scan direction, then the radiation scattered from the wire at its y-position $I_s(y)$ is related to the beam profile as $$I_s(y) = a \int_{-\infty}^{\infty} I(x, y) dx \qquad (1)$$

where α is a constant characterizing the scattering cross-section of the wire which has dimensionality of $cm^{-1}$ and is determined by the wire properties and the radiation wavelength.

As an example, in case of a laser beam with Gaussian profile, $$I(x, y) = I_0 \exp\left\{-2\frac{x^2 + y^2}{w^2}\right\}, \qquad (2)$$

the scattered intensity Is has the profile of the laser beam along the y-axis:

$$I_s(y) \propto \exp\left\{-2\frac{y^2}{w^2}\right\} \qquad (3)$$

Thus, scanning the wire 115, stretched along the x-axis, along the y-axis allows determination of the laser beam profile along the y-axis. Similarly, the laser beam radius along the x-axis can be determined with a wire stretched along the y-axis and being scanned along the x-axis.

Figure 3:
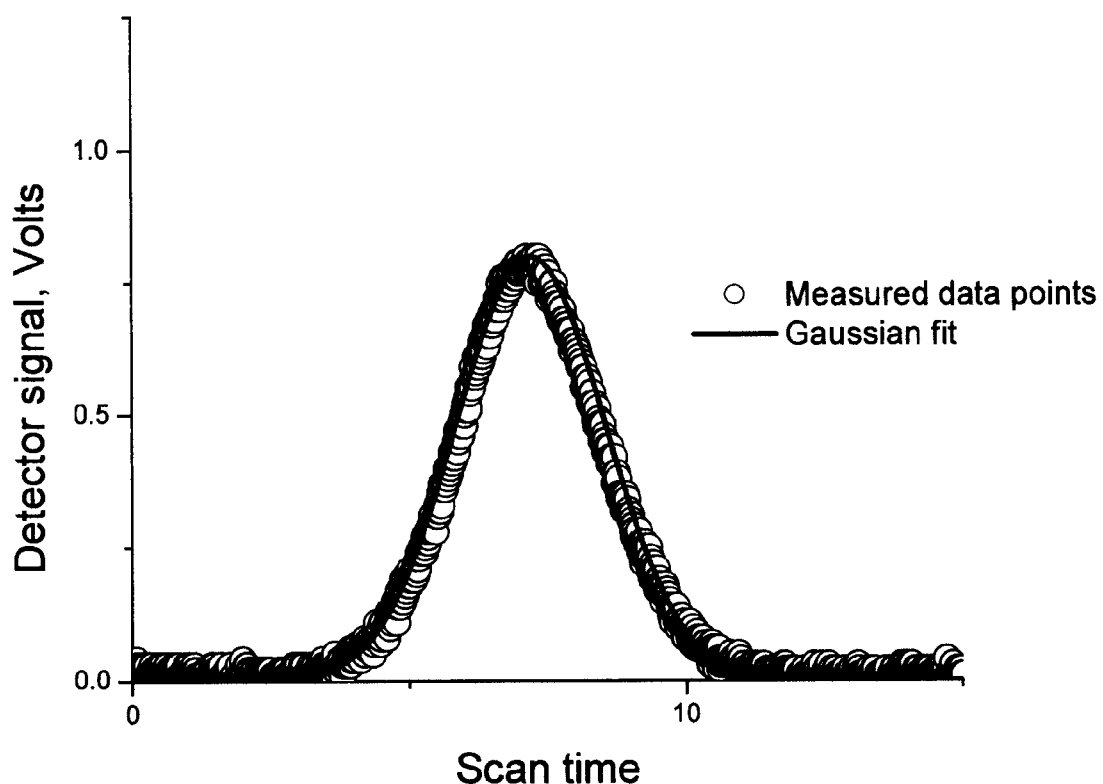
FIG. 3 is an experimentally obtained plot of the light intensity scattered from a 28 μm-thick steel wire moving across an infrared continuous wave laser beam (λ=1.06 μm).

The operation of such a line-scanner was tested with the aid of a prototype device using a steel wire thread of 28 μm thickness and 1 cm length. It was scanned across the beam with the aid of a linear motorized micrometer the speed of which has been measured in the same test with a self-calibration procedure. The self-calibration procedure is realized by fixing a second wire parallel to the first wire at a pre-established distance L. The signal generated by each wire crossing the laser beam has a peak as shown in FIG. 3. The time interval between these peaks ΔT allows determination of the speed of motion as v=L/ΔT. The width of the beam w is then determined from the width of the individual peak Δt as w=vΔt.

Figure 4:
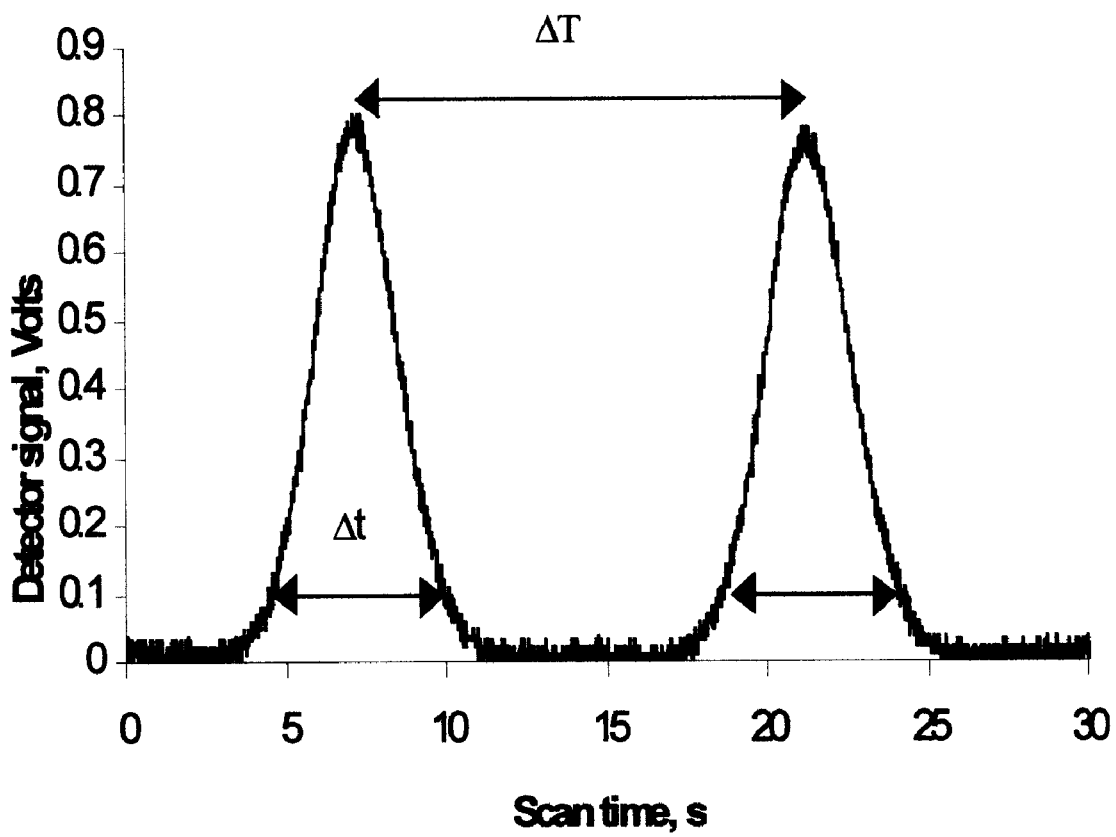
FIG. 4 shows two peaks of the signal obtained due to scattering of a laser beam from two steel wire threads fixed at a preestablished distance parallel to each other. The distance between the peaks allows independent measurement of the speed of motion of the wires across the laser beam, which is needed for self-calibrated determination of the beam width.

In our tests, the scattered light has been collected with the aid of a lens into a photodetector which is fixed at a small angle with respect to the wire. The signal registered by the photodetector is shown in FIG. 4.

The line-scanner, in accordance with the present invention, offers, among others, the following advantages:

The thread can cross the laser beam in a small fraction of a second, which ensures applicability of the technique to high power radiation;

The sampling factor can be a rather small part of the main beam by proper choice of the wire material and diameter. In our tests, we had a sampling factor of the order of $10^{-5}$;

The main beam is not distorted and not interrupted. The measurement is done on-line.

There are no alignment procedures;

The technique is independent on the beam diameter and can be applied to the largest existing laser beams;

The technique is independent on the beam wavelength and polarization;

The dynamic range is large which can easily be controlled by varying the sensitivity of the photodetector or the distance between the photodetector and the scattering thread;

The technique is insensitivity to temperature variation and to the environmental conditions;

The line-scan equipment devices can easily and inexpensively be manufactured.

Although the present invention has been described above by way of a preferred embodiment, this embodiment can be modified at will, within the scope of the appended claims, without departing from the spirit and nature of the subject invention. Examples of such modifications include using more than one photodetector, non-linear shape of wires, and non-linear trajectory of the scan.

We claim:

1. An apparatus for characterizing power density distribution of a laser beam comprising:
   a. a thread made of any material capable of scattering or reflecting or diffracting electromagnetic radiation;
   b. means for holding said thread and moving it across the laser beam at a predetermined speed and trajectory;
   c. means for detecting the radiation scattered or reflected or diffracted from said thread and providing a signal proportional to the power density parameters of said portion of the beam;
   d. detector means for receiving said portion of said beam from said collecting means and providing a signal proportional to the power parameters of said portion of the beam;
   e. data processing means connected to said sensor means for receiving said signal and for outputting information about the width of the laser beam based upon the measured width of the signal in time and the speed of motion of the thread across the beam;
   f. indicator means for providing visual information about the measured width of the beam.

2. Apparatus as in claim 1 wherein the thread is made of materials or composition such as glass, ceramic, metal, polymer, and gas.

3. Apparatus as in claim 1 wherein the speed of the scan of the thread is kept constant while the thread is crossing the laser beam.

4. Apparatus as in claim 1, further comprising
   a. more than one thread moving across the laser beam in different directions;
   b. means for detecting the radiation scattered or reflected or diffracted from said threads and providing a signal proportional to the integrated power density parameters of said portion of the beam for each thread;
   data processing means connected to said sensor means for receiving said signal and for outputting information about the width of the laser beam in different directions of the laser beam cross-section and serving as inputs for tomographic reconstruction of the laser beam profile.

5. Apparatus as claimed in any one of claims 1, 2, 3 or 4 wherein the trajectory of the thread intersects the laser beam in two or more cross-sections along the propagation direction of the laser beam for determining the beam divergence and quality.

* * * * *